United States Patent [19]

Cleveland et al.

[11] Patent Number: 5,095,310
[45] Date of Patent: Mar. 10, 1992

[54] METHOD AND APPARATUS FOR USING SYNTHESIZED ANALOG DATA FOR TESTING READ CIRCUITRY IN A MAGNETIC TAPE DATA STORAGE SUBSYSTEM

[75] Inventors: Brian G. Cleveland; Bela A. Geczy, both of Boulder, Colo.

[73] Assignee: Storage Technology Corporation, Louisville, Colo.

[21] Appl. No.: 571,304

[22] Filed: Aug. 22, 1990

[51] Int. Cl.⁵ .............................................. G11B 5/02
[52] U.S. Cl. ...................................... 341/120; 360/27
[58] Field of Search .......................... 341/120; 360/27; 358/21 V

[56] References Cited

U.S. PATENT DOCUMENTS

| | | | |
|---|---|---|---|
| 3,727,012 | 4/1973 | Cox et al. | 360/27 |
| 4,150,403 | 4/1979 | Miller | 360/27 |
| 4,338,589 | 7/1982 | Engel et al. | 341/120 |
| 4,612,533 | 9/1986 | Evans | 341/120 |
| 4,724,484 | 2/1988 | Ward | 360/27 |
| 4,795,963 | 1/1989 | Ueno et al. | 341/120 |
| 4,903,024 | 2/1990 | Evans et al. | 341/120 |
| 4,931,877 | 6/1990 | Gebhardt et al. | 360/27 |
| 4,947,168 | 8/1990 | Myers | 341/120 |

Primary Examiner—A. D. Pellinen
Assistant Examiner—Marc S. Hoff
Attorney, Agent, or Firm—Dorr, Carson, Sloan & Peterson

[57] ABSTRACT

The system of the present invention makes use of a data synthesizer to produce a synthesized analog data signal representative of a special encoded binary waveform to perform a test on both the magneto resistive element as well as the associated read path electronics independent of operator intervention. The special encoded binary waveform is coupled to the magneto resistive element to produce an approximation of the typical read back signal that is read by the magneto resistive element from a test magnetic tape. The analog signal output by the magneto resistive element is applied to the read back electronics, where it is converted in well known fashion to a digital data signal indicative of the synthesizer block of data that is applied to the magneto resistive element. The output of the read path electronics is applied to a special pattern detector, a sync pattern detector and a test pattern detector which function to detect anomalies in the digital data that is output by the read path electronics.

18 Claims, 3 Drawing Sheets

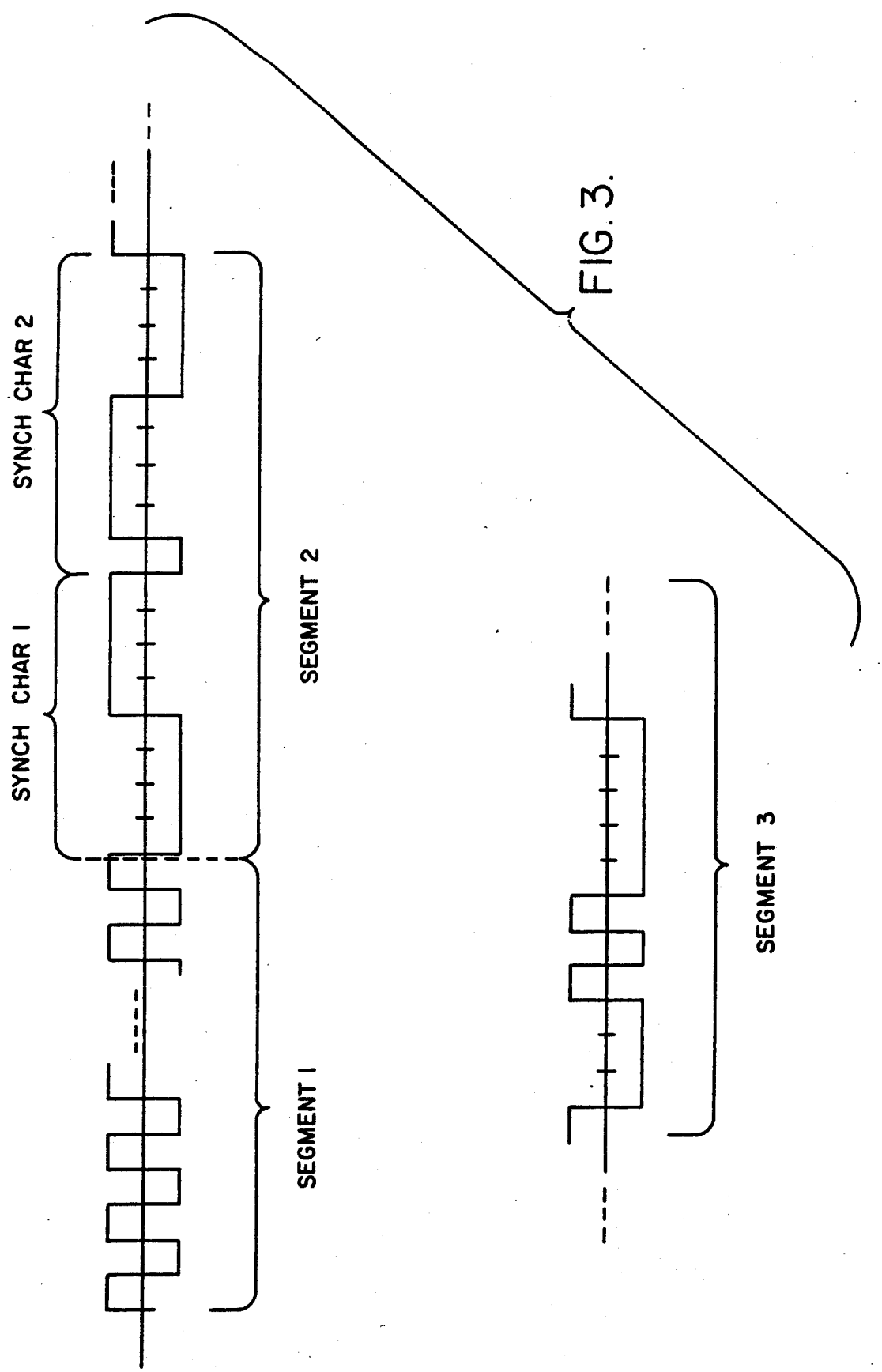

METHOD AND APPARATUS FOR USING SYNTHESIZED ANALOG DATA FOR TESTING READ CIRCUITRY IN A MAGNETIC TAPE DATA STORAGE SUBSYSTEM

FIELD OF THE INVENTION

This invention relates to magnetic tape data storage subsystems and, in particular, to a method and apparatus for producing a synthesized set of analog data which is applied to the magneto resistive element in the data read circuit to test this circuit in a magnetic tape data storage subsystem.

PROBLEM

It is a problem in the field of magnetic tape data storage subsystems to efficiently test both the magneto resistive element that is used to sense the magnetization on the associated magnetic tape as well as the associated read electronics which convert the analog waveform produced by the magneto resistive element into a digital data signal indicative of the data stored on the associated magnetic tape. Existing read circuit test arrangements make use of data written on a magnetic tape to test both the magneto resistive element and read path electronics in the read circuit of the magnetic tape data storage subsystem. A difficulty with this arrangement is that the test data written onto the magnetic tape may vary in its characteristics thereby skewing the results of the test that is performed on the read circuit. Furthermore, an operator must manually load the magnetic tape into the associated magnetic tape data storage subsystem in order to initiate the test of the read circuit.

An alternative to the magnetic tape test arrangement is the limited automated testing provided by circuits known in the prior art which inject digital data into the phase lock loop circuit contained in the read path electronics. A difficulty with this arrangement is that only a portion of the read circuit is tested and errors in the remaining untested segments of the read circuit still require the use of a test magnetic tape which is manually loaded by the operator. Therefore, there is presently no known arrangement to automatically and efficiently perform a test on both the magneto resistive element and the associated read path electronics independent of operator intervention in magnetic tape data storage subsystems.

SOLUTION

The above described problems are solved and a technical advance achieved in the field by the method and apparatus using synthesized analog data to test the read circuit in a magnetic tape data storage subsystem. The system of the present invention makes use of a data synthesizer to produce a synthesized analog data signal representative of a special encoded binary waveform to perform a test on both the magneto resistive element as well as the associated read path electronics independent of operator intervention. The special encoded binary waveform is coupled to the magneto resistive element to produce an approximation of the typical read back signal that is read by the magneto resistive element from a test magnetic tape. The data synthesizer thereby produces a signal waveform in the magneto resistive element representative of a synthesized block of data in a manner that replicates the actual reading of data from an associated magnetic tape. The analog signal output by the magneto resistive element is applied to the read back electronics, where it is converted in well known fashion to a digital data signal indicative of the synthesized block of data that is applied to the magneto resistive element. The output of the read path electronics is applied to a special pattern detector, a sync pattern detector and a test pattern detector which function to detect anomalies in the digital data that is output by the read path electronics.

The synthesized waveform consists of a data block which contains a predetermined pattern of data followed by a unique sync pattern and optionally a test pattern of data. This synthesized waveform thereby tests the ability of the read path electronics to synchronize to an input analog read signal as well as to accurately read data of a predetermined test pattern. Any anomalies detected in the synthesized waveform, as converted into digital data by the read path electronics, is detected by the sync detector, special pattern detector and test pattern detector circuits. The nature, location and frequency of these anomalies are indicative of failures in either the magneto resistive element or the associated read path electronics. The automated testing is performed independent of an operator loading a magnetic tape and any irregularities detected by the special pattern detector, sync detector or test pattern detector circuits can be used to alert repair personnel to replace or repair the defective components in the data read circuit of the magnetic tape data storage subsystem.

BRIEF DESCRIPTION OF THE DRAWING

FIG. 3 illustrates the format of a typical data block which can be used as the synthesized analog data for testing purposes.

DETAILED DESCRIPTION

Figure 1:
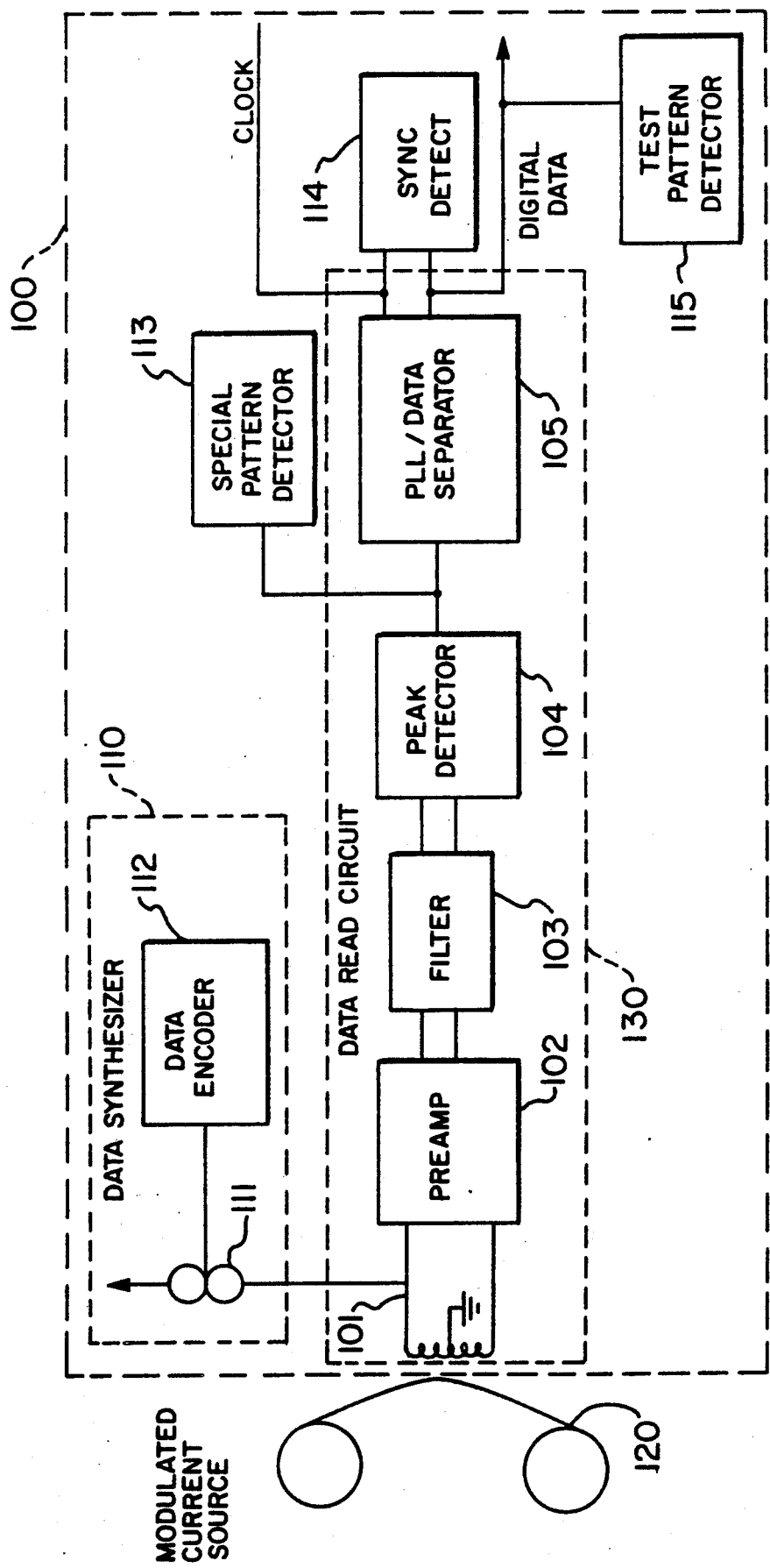
FIG. 1 illustrates in block diagram form the overall architecture of the subject apparatus for testing the data read circuit in a magnetic tape data storage subsystem.

FIG. 1 illustrates in block diagram form the overall architecture of a typical data read circuit in a magnetic tape data storage subsystem 100. The data read circuit 130 in the magnetic tape data storage subsystem 100 includes a magneto resistive tape head 101 of a type well known in the art. The magneto resistive tape head 101 is a eighteen track read head which is placed in juxtaposed position to a tape path wherein a mechanical tape transport mechanism (not shown in detail) transports the magnetic tape 120 across the magneto resistive tape head 101 in order to enable the magneto resistive tape head 101 to detect data written on the magnetic tape 120. In response to the moving magnetic tape 120 and the magnetization written thereon, magneto resistive tape head 101 produces an analog signal which is applied to preamplifier 102 to shape and amplify the analog signal produced by the magneto resistive tape head 101. This improved analog signal is output by preamplifier 102 to peak detector circuit 104 via filter circuit 103. These circuits function to extract the data contained within the analog signal output by the magneto resistive tape head 101 and apply this extracted data to phase lock loop and data separator circuit 105. The phase lock loop and data separator circuit 105 functions to extract a clock signal from the self clocked data read from the magnetic tape 120. In addition, phase lock loop and data separator circuit 105 produces a digital data signal indicative of the data that is stored on magnetic tape 120. These above described elements are well known in the magnetic tape data storage subsystem art and represent a standard magneto resistive tape head and associated read path electronics.

Analog Data Synthesizer

In order to automatically perform a test on the magneto resistive tape head 101 and the entirety of the associated read path electronics 102-105, an analog data synthesizer 110 consisting of eighteen modulated current sources 111 and data encoder circuit 112 are added to the standard data read circuit 130 of the magnetic tape data storage subsystem 100. The modulated current sources 111 are directly connected to the magneto resistive tape head 101 and functions to apply a current signal to the magneto resistive tape head 101 under control received from output signals of data encoder circuit 112. The current signal output by eighteen modulated current sources 111 drives each track of magneto resistive tape head 101. Data encoder circuit 112 produces a special encoded binary waveform which modulates the output of the modulated current sources 111, thereby producing a synthesized block of data. As a result, data synthesizer 110 drives magneto tape head 101 in a manner that is analogous to the operation of magnetic tape 120 and its associated tape transport transporting the tape along the tape path across the magneto resistive tape head 101 to read the magnetically encoded data therefrom. Thus, the modulated current sources 111 drive the eighteen tracks of magneto resistive tape head 101 in a manner that is analogous to the drive signal produced by the magnetic tape 120.

Synthesized Block of Data

The content of the synthesized data signal applied to the magneto resistive tape head 101 by modulated current source 111 is selected to exercise both magneto resistive tape head 101 as well as the associated read path electronics 102-105. In order to test the operation of this circuit, the synthesized block of data includes a predetermined pattern of data followed by a unique synchronization pattern and optionally a test pattern of data. This selected data tests the ability of the read circuit 130 to properly detect data written on the associated magnetic tape 120 as well as the ability of the read circuit 130 to synchronize to the data pattern contained therein.

FIG. 3 illustrates the format of a typical data block that is produced by the analog data synthesizer 110. This data block consists of three segments: an initial predetermined pattern of data; two synchronization characters; and a data test pattern. The initial series of pulses of predetermined pattern, in the preferred embodiment, is forty sequential one bits, where a data 1 represents a state transition between high and low or low to high states regardless of the direction of the transition. This string of one bits causes the phase locked loop and data separator 105 to lock on to the incoming signal and synchronize thereto to produce the necessary clock signal at the appropriate frequency. Following the initial predetermined data pattern, a second segment is transmitted, consisting of at least one synchronization character. In the preferred embodiment illustrated in FIG. 3, two synchronization characters are transmitted, with each synchronization character consisting of a nine bit data pattern consisting of a one bit in the zero, four and eight locations in the nine bit synchronization character. This nine bit synchronization character is replicated twice before the final segment of the synthesized signal is transmitted by data synthesizer 110. This final segment represents a test pattern of data of a content that can be selected to appropriately test the operation of the data read circuit 130. FIG. 3 illustrates only a few sample bits of a typical test pattern that can be produced, since the test pattern selected is a function of the implementation of the data read circuit 130 and the need to test the various elements contained therein. What is of significance is that the data synthesizer 110 produces a test pattern which is preprogrammed therein in the data encoder 112.

Figure 2:
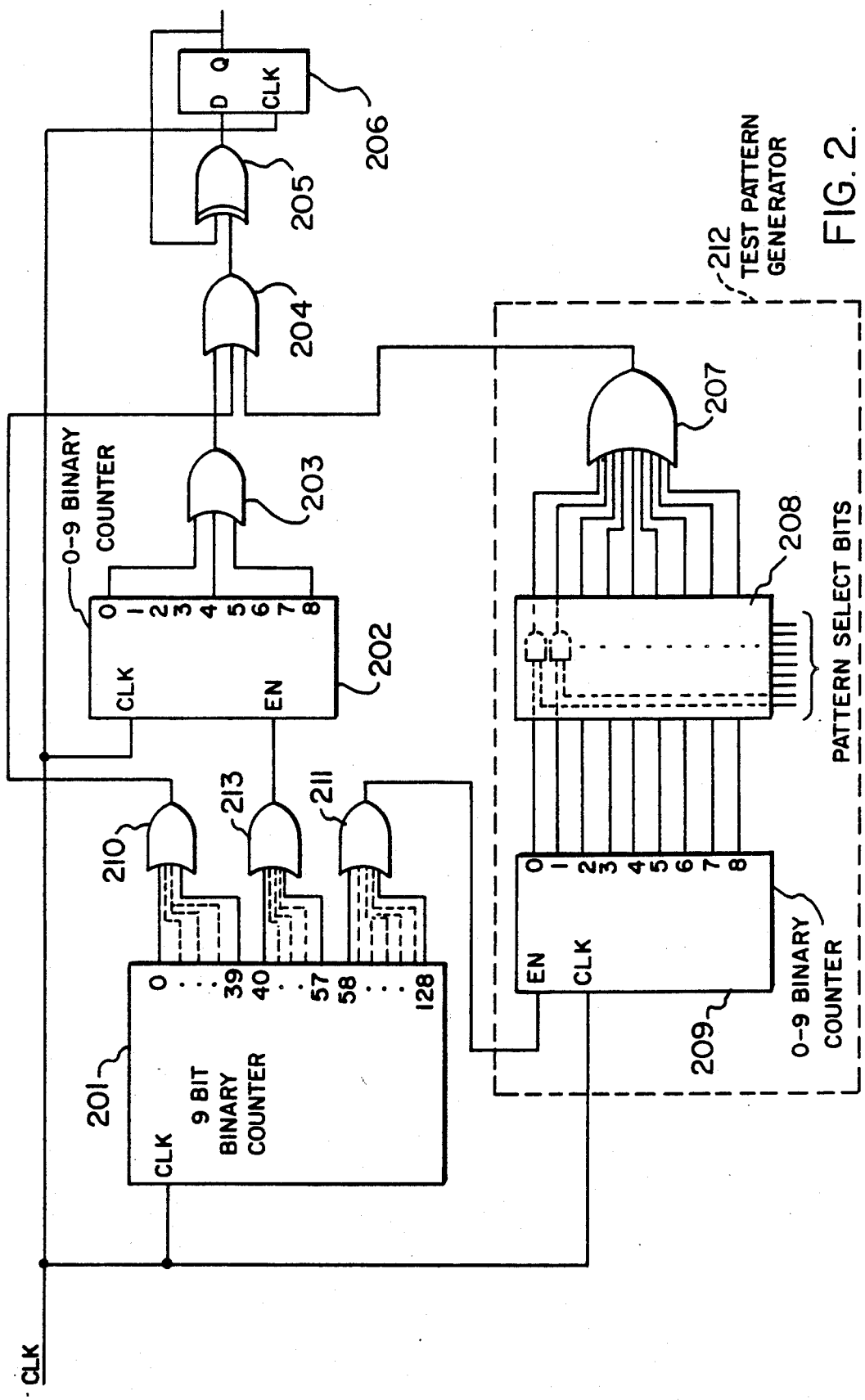
FIG. 2 illustrates additional circuit details of the data synthesizer circuit.

FIG. 2 illustrates additional details of data encoder 112 which produces the synthesized analog data signal illustrated in FIG. 3. A clock signal obtained from within the magnetic tape data storage subsystem 100 is used to drive the circuit illustrated in FIG. 2. A synchronous clock of 1.95 megahertz is typically available in such a system and is used to drive 9 bit binary counter 201. The first 40 outputs (0-39) from 9 bit binary counter 201 are connected to OR gate 210 which drives OR gate 204. The output of OR gate 204 causes exclusive OR gate 205 to operate as a simple invertor. Exclusive OR gate 205 therefore inverts the Q output of flip flop 206 and applies it to the D input of flip flop 206, enabling flip flop 206 to divide by two the clock signal received on input CLK. Therefore, flip flop 206 divides by two the 1.95 megahertz clock signal received on lead CLK and outputs forty clock pulses as the initial segment of the synthesized data signal to modulated current source 111.

When the next eighteen clock pulses are received, 9 bit binary counter 201 places a high signal on output leads 40 and 41 to activate OR gate 213, which enables 9 bit binary counter 202. The 0 to 9 bit binary counter 202 has its output leads 0, 4 and 8 connected to OR gate 203. Therefore, when the first, fifth and ninth clock signals are received by 0 to 9 bit binary counter 202, they activate OR gate 203 which drives OR gate 204 to enable exclusive OR gate 205 to cause flip flop 206 to change state in synchronization with the input clock signal on lead CLK. The output of flip flop 206 is applied to modulated current source 111. Therefore, the 0 to 9 bit binary counter 202 produces a one bit, followed by three zeros, followed by a one bit followed by three zeros and finally outputs a one bit. Nine bit binary counter 202 completes two sequences following the fort bit string of ones and 9 bit binary counter 201 then enables test pattern generator 212.

As an example of an implementation of test pattern generator 212, 0 to 9 bit binary counter 209 is coupled with programmable gate array 208 to output a pattern of one bits to OR gate 207 as selected by the pattern select bits applied to gate array 208. This pattern of one bits activates OR gate 204 which enables exclusive OR gate 205 to cause flip flop 206 to change state in synchronization with the input clock signal.

In this manner, the circuit of FIG. 2 or its equivalent produces the predetermined pattern of data that represents the initial segment of the synthesizer analog data signal as well the plurality of synchronization characters and, finally the test pattern of data all of which are applied to the input of modulator current source 111 to produce the analog current signal applied to magneto resistive tape head 101.

The signals produced by modulated current source 111 are applied to magneto resistive tape head 101 in any of a number of ways. Typically, magneto resistive tape head 101 consists of eighteen tracks and there is required a modulated current source for each one of these tracks to drive magneto resistive tape head 101. Therefore, the data encoder 112 produces an output which is coupled through eighteen identical modulated current source circuits to the various tracks on magneto resistive tape head 101 to drive all eighteen tracks using the same signal produced by the eighteen individual modulator current sources 111. The exact details of this driver circuit is a function of the specific design of magneto resistive tape head 101 and is well within the capability of one skilled in the art.

Read Data Detection and Analysis

The block of data introduced into the magneto resistive tape head 101 by the data encoder 112 and modulated current source 111 is processed in standard fashion by the read path electronics 102-105. The initial segment produced by data synthesizer 110 consists of a string of forty sequential one bits which is detected by special pattern detector 113. The pattern of one bits is also used by phase lock loop 105 to synchronize to the incoming data stream. Special pattern detector 113 is a programmable logic array of the type known as an AMD22V10 device produced by Advanced Micro Devices. This device is programmable and functions to monitor the output of peak detector circuit 104 to note the presence of a string of sequential one bits contained therein. Table 1 indicates the programming required to cause the special pattern detector 113 to detect the presence of a string of ones characters output by peak detector 104.

TABLE 1

```
Define Inputs:
clock
data
Define Outputs:
a
b
c
d
e
f
dtad
ones
Define Intermediate Equations:
RSTCNT =D*/C*/B*A;
Define Equations:
DTAD       :=DTA;
A          :=/A*/DTAD*/RSTCNT;
B          :=A*/B*/DTAD*/RSTCNT
           +/A*B*/DTAD*/RSTCNT;
C          :=A*B*/C*DTAD*/RSTCNT
           +C*/B*/DTAD*/RSTCNT
           +C*/A*/DTAD*/RSTCNT;
D          :=A*B*C*/D*/DTAD*/RSTCNT
           +D*/C*/DTAD*/RSTCNT
           +D*/B*/DTAD*/RSTCNT
           +D*/A*/DTAD*/RSTCNT;
ONES       :=/D*/C*B*A*DTAD
           +/D*C*/B*/A*DTAD
           +/D*C*/B*A*DTAD
           +/D*C*B*/A*DTAD
           +/D*C*B*A*DTAD
           +ONES*/DTAD*/RSTCNT
           +ONES*DTAD*/D*/C*/B*/A
           +ONES*DTAD*/D*/C*/B*A;
```

In operation, special pattern detector 113 measures the spacing of the ones pulses based on the input 1.95 megahertz clock. The programming of special pattern detector 113 creates a window of from 300 nanoseconds to 700 nanoseconds in which time period a one pulse must appear in order to be considered a valid pulse. The pulses produced by data synthesizer 110 have a nominal spacing of 514 nanoseconds and should fall in the center of the window defined by special pattern detector 113. When special pattern detector 113 detects the presence of a valid pulse within the defined window, it increments an internal counter to indicate the presence of successive valid pulses received from peak detector 104.

In similar fashion, the synchronization detector 114 detects the presence of the synchronization characters transmitted subsequent to the initial segment of forty successive one bits. The same type of programmable logic array device is used to implement synchronization detector 114. Table 2 illustrates the programming of synchronization detector 114 to detect the presence of the one bits in positions 0, 4 and 8 in the nine bit synchronization character.

TABLE 2

```
SYNC CHAR: = A*/QB*/QC*/QD* QE*/QF*/QG*/QH*QI
WHERE       QB : = A
            QC : = QB
            QD : = QC
            QE : = QD
            QF : = QE
            QG : = QF
            QH : = QG
            QI : = QH
```

The presence of three one bits in this nine bit synchronization character cause synchronization detector 114 to acknowledge the receipt of a valid synchronization character. Similarly, test pattern detector 115 can be programmed to monitor the output of phase lock loop and data separator circuit 105 to detect the presence of the unique character pattern produced by data synthesizer 110 and, in particular, test pattern generator 212 contained therein. In this manner, the three unique segments produced by data synthesizer 110 are transmitted throughout the entirety of the data read circuit 130 and each of the segments is detected by an associated monitoring circuit: special pattern detector 113, synchronization detector 114, and test pattern detector 115. This test circuit can automatically test the operation of data read circuit 130 independent of an operator loading a magnetic tape thereon and functions to test the entirety of the data read circuit 130.

While a specific embodiment of this invention has been disclosed, it is expected that those skilled in the art can and will design alternate embodiments of this invention that fall within the scope of the appended claims.

We claim:

1. In a data storage system which reads data from a magnetic tape mounted therein using a magneto-resistive element which outputs an analog signal to associated read electronics which converts said analog signal to a digital data signal representative of said data read from said magnetic tape, a data read/write integrity verification circuit for determining the operational integrity of said magneto-resistive element and associated read electronics independent of the presence of said magnetic tape comprising:

means connected to said magneto-resistive element for applying a synthesized analog signal to said magneto-resistive element to represent data of a predetermined pattern, including:

data encoder means for producing a signal representative of said predetermined pattern, including means for producing a series of pulses of predetermined pattern and means for appending at least one synchronization character to said series of pulses, current source means connected to said magneto-resistive element and responsive to said signal produced by said data encoder means for applying said synthesized analog signal, in the form of a current modulated by said signal produced by said data encoder means, to said magneto-resistive element; and means connected to said read electronics for detecting the presence of said predetermined pattern in said digital data signal output by said associated read electronics.

2. The apparatus of claim 1 wherein said detecting means includes:

means for identifying the presence of said series of pulses of predetermined pattern in said read electronics.

3. The apparatus of claim 2 wherein said detecting means further includes:

means for identifying the presence of said synchronization character in said digital data signal output by said read electronics.

4. The apparatus of claim 3 further including:

means responsive to at least one of said synchronization character identifying means and said predetermined pattern identifying means failing to identify the presence of said synchronization character and said series of pulses of predetermined pattern, respectively, for producing a signal indicative of a failure in said data read circuit.

5. The apparatus of claim 1 wherein said data encoder means further includes:

means for appending a test pattern of data to said at least one synchronization character.

6. The apparatus of claim 5 wherein said detecting means includes:

means for determining the presence of said test pattern of data in said digital data signal output by said read electronics.

7. In a data storage system which reads data from a magnetic tape mounted therein using a magneto-resistive element which outputs an analog signal to associated read electronics which converts said analog signal to a digital data signal representative of said data read from said magnetic tape, a data read/write integrity verification circuit for determining the operational integrity of said magneto-resistive element and associated read electronics independent of the presence of said magnetic tape comprising:

means connected to said magneto-resistive element for applying a synthesized analog signal to said magneto-resistive element to represent data of a predetermined pattern, comprising:

means for producing a series of pulses of predetermined pattern;

means for appending at least one synchronization character to said series of pulses, current source means connected to said magneto-resistive element for applying a current, modulated by said series of pulses of predetermined pattern and at least one synchronization character appended to said series of pulses, to said magneto-resistive element;

means connected to said read electronics for detecting the presence of said predetermined pattern in said digital data signal output by said associated read electronics, comprising:

means for identifying the presence of said synchronization character in said digital data signal output by said read electronics, means for determining the presence of said series of pulses of predetermined pattern in said read electronics.

8. In a data storage system which reads data from a magnetic tape mounted therein using a magneto-resistive element which outputs an analog signal to associated read electronics which converts said analog signal to a digital data signal representative of said data read from said magnetic tape, a data read/write integrity verification circuit for determining the operational integrity of said magneto-resistive element and associated read electronics independent of the presence of said magnetic tape comprising:

means connected to said magneto-resistive element for applying at least one synchronization character to said magneto-resistive element;

means connected to said read electronics for detecting the presence of said at least one synchronization character in said digital data signal output by said associated read electronics.

9. The apparatus of claim 8 wherein said applying means prepends a predetermined pattern of pulses to said at least one synchronization character.

10. The apparatus of claim 9 wherein said detecting means includes:

means for identifying the presence of said series of pulses of predetermined pattern in said read electronics.

11. The apparatus of claim 8 wherein said applying means appends a test pattern of data to said at least one synchronization character.

12. The apparatus of claim 11 wherein said detecting means includes:

means for determining the presence of said test pattern of data in said digital data signal output by said read electronics.

13. The apparatus of claim 8 wherein said applying means prepends a predetermined pattern of pulses to said at least one synchronization character and appends a test pattern of data to said at least one synchronization character, said detecting means includes:

means for identifying the presence of said series of pulses of predetermined pattern in said read electronics;

means for determining the presence of said test pattern of data in said digital data signal output by said read electronics.

14. The apparatus of claim 13 further including:

means responsive to at least one of said synchronization character identifying means and said predetermined pattern identifying means failing to identify the presence of said synchronization character and said series of pulses of predetermined pattern, respectively, for producing a signal indicative of a failure in said data read circuit.

15. In a data storage system which reads data from a magnetic tape mounted therein using a magneto-resistive element which outputs an analog signal to associated read electronics which converts said analog signal to a digital data signal representative of said data read from said magnetic tape, a data read/write integrity verification circuit for determining the operational integrity of said magneto-resistive element and associated read electronics independent of the presence of said magnetic tape comprising:

means for generating at least one synchronization character and a prepended predetermined pattern of pulses;

means connected to said magneto-resistive element and said generating means for applying said generated pattern of pulses and synchronization character to said magneto-resistive element;

means connected to said read electronics for detecting the presence of said at least one synchronization character in said digital data signal output by said associated read electronics.

16. The apparatus of claim 15 wherein said detecting means includes:

means for identifying the presence of said series of pulses of predetermined pattern in said read electronics.

17. The apparatus of claim 15 wherein said applying means appends a test pattern of data to said at least one synchronization character.

18. The apparatus of claim 17 wherein said detecting means includes:

means for determining the presence of said test pattern of data in said digital data signal output by said read electronics.

* * * * *